United States Patent
Richard (10) Patent No.: US 11,073,609 B2
(45) Date of Patent: Jul. 27, 2021

(54) PARKING MANAGEMENT SYSTEM

(71) Applicant: PARK24, Paris (FR)

(72) Inventor: Xavier Richard, Paris (FR)

(73) Assignee: CIRCET, Sollies-Pont (FR)

( * ) Notice: Subject to any disclaimer, the term of this patent is extended or adjusted under 35 U.S.C. 154(b) by 410 days.

(21) Appl. No.: 15/118,467

(22) PCT Filed: May 5, 2015

(86) PCT No.: PCT/EP2015/059857
§ 371 (c)(1),
(2) Date: Aug. 11, 2016

(87) PCT Pub. No.: WO2015/169802
PCT Pub. Date: Nov. 12, 2015

(65) Prior Publication Data
US 2017/0148230 A1    May 25, 2017

(30) Foreign Application Priority Data

May 8, 2014 (EP) .................................. 14167607

(51) Int. Cl.
*G01S 13/86*    (2006.01)
*G01S 13/04*    (2006.01)
(Continued)

(52) U.S. Cl.
CPC ............ *G01S 13/86* (2013.01); *G01S 7/2922* (2013.01); *G01S 13/04* (2013.01); *G01S 13/325* (2013.01);
(Continued)

(58) Field of Classification Search
CPC .... G07B 15/02; G06Q 2240/00; G01S 13/04; G01S 13/86; G01S 13/88; G08G 1/14; G08G 1/042; H04L 67/141
See application file for complete search history.

(56) References Cited

U.S. PATENT DOCUMENTS 5,910,782 A    6/1999   Schmitt et al.
7,714,742 B1   5/2010   Noworolski et al.
(Continued)

FOREIGN PATENT DOCUMENTS

WO    WO-2013091100 A1 *    6/2013    ............. G08G 1/143

OTHER PUBLICATIONS

Kurtz, Glenn. "The City of McDonough Parking Best Practices Review" Jul. 12, 2012. Retrieved May 7, 2021 from <https://www.mcdonoughga.org/home/showpublisheddocument/766/635199529428770000>.*

(Continued)

*Primary Examiner* — Daniel Vetter
*Assistant Examiner* — Manal A. Alsamiri
(74) *Attorney, Agent, or Firm* — BCF LLP (57) ABSTRACT

A method comprising, ascertaining and communicating, by a parking meter (102), presence of a vehicle in the parking space to a central server (104). Further, a session with a user device (112) of a user of the vehicle is established. Further, a parking validation message from the user device (112) is received. Further, a payment request message is transmitted to the user device (112). Further, the user device (112) transmits the payment request message to the central server (104) over a parking payment session. Further, an authorization status is received from the central server (104), where the authorization status indicates one of an authorized occupancy of the parking space and an unauthorized occupancy of the parking space. Further, a status indicator based on the authorization status is displayed, where the status indicator indicates one of the authorized occupancy of the parking space and the unauthorized occupancy of the parking space.

17 Claims, 6 Drawing Sheets

(51) Int. Cl.
    *G08G 1/042*     (2006.01)
    *G08G 1/14*     (2006.01)
    *G01S 13/88*     (2006.01)
    *G01S 13/32*     (2006.01)
    *G01S 7/292*     (2006.01)
    *G07B 15/02*     (2011.01)
    *H04L 29/08*     (2006.01)
    *G01S 13/36*     (2006.01)
    *G01S 13/26*     (2006.01)

(52) U.S. Cl.
    CPC .............. *G01S 13/88* (2013.01); *G07B 15/02* (2013.01); *G08G 1/042* (2013.01); *G08G 1/14* (2013.01); *H04L 67/141* (2013.01); *G01S 13/26* (2013.01); *G01S 13/36* (2013.01); *G06Q 2240/00* (2013.01)

(56) References Cited

U.S. PATENT DOCUMENTS

| | | | | |
|---|---|---|---|---|
| 8,749,403 | B2* | 6/2014 | King | G07B 15/02 235/375 |
| 2002/0008639 | A1* | 1/2002 | Dee | G07B 15/02 340/932.2 |
| 2002/0109610 | A1 | 8/2002 | Katz | |
| 2002/0109611 | A1 | 8/2002 | Howard et al. | |
| 2006/0136131 | A1* | 6/2006 | Dugan | G08G 1/14 701/300 |
| 2008/0291054 | A1 | 11/2008 | Groft | |
| 2009/0192950 | A1* | 7/2009 | King | G07B 15/02 705/418 |
| 2010/0090865 | A1 | 4/2010 | Dasgupta | |
| 2011/0163894 | A1* | 7/2011 | Grievink | G08G 1/042 340/932.2 |
| 2011/0221624 | A1* | 9/2011 | Kavaler | G01S 13/04 342/22 |
| 2012/0044091 | A1* | 2/2012 | Kim | G08G 1/143 340/932.2 |
| 2012/0095791 | A1* | 4/2012 | Stefik | G06Q 50/265 705/5 |
| 2014/0214499 | A1* | 7/2014 | Hudson | G07F 17/246 705/13 |
| 2014/0365283 | A1* | 12/2014 | Stenneth | G07B 15/02 705/13 |

OTHER PUBLICATIONS

International Search Report with regard to PCT/EP2015/059857 dated Aug. 18, 2015.
European Search Report with regard to EP14167607 dated Apr. 2, 2015.

* cited by examiner

PARKING MANAGEMENT SYSTEM

TECHNICAL FIELD

The present subject matter is related, in general, to a parking management system and, in particular, to methods and systems for authorizing occupancy of a parking space.

BACKGROUND

In recent years, a computerized approach towards management of parking spaces has been witnessed. For example, parking management systems are nowadays deployed for managing the parking spaces in parking lots, parking garages, and parking in streets. Typically, such parking management systems facilitate monitoring of the parking spaces. For example, the parking management systems may facilitate payment of parking charges corresponding to the parking spaces.

SUMMARY

This summary is provided to introduce concepts related to parking management system. This summary is not intended to identify essential features of the claimed subject matter nor is it intended for use in determining or limiting the scope of the claimed subject matter.

In one implementation, a method for monitoring a parking space by a parking meter is disclosed. The method comprises ascertaining and communicating, by the parking meter, presence of a vehicle in the parking space to a central server. The central server may be communicatively coupled to the parking meter. The method further comprises establishing, by the parking meter, a session with a user device of a user of the vehicle based on a session establishment request received from the user device. Further, a parking validation message is received by the parking meter from the user device, where the parking validation message indicates a confirmation of occupancy of the parking space for parking by the vehicle. The method further comprises transmitting, by the parking meter, a payment request message comprising an identity (ID) corresponding to the location of the parking space to the user device, and where the payment request message indicates a request for payment of parking charges corresponding to the parking space by the user, and where the parking charges are based on a predefined charging policy. Further, the user device transmits the payment request message to the central server over a parking payment session for facilitating payment of the parking charges corresponding to the parking space, and where the parking payment session is established between the user device and the central server, and where the central server is communicatively coupled to the parking meter. Further, an authorization status is received by the parking meter from the central server, where the authorization status indicates one of an authorized occupancy of the parking space and an unauthorized occupancy of the parking space based on the presence of the vehicle as ascertained and one of compliance and non-compliance to the predefined charging policy by the user. The method further comprises displaying, by the parking meter, a status indicator based on the authorization status, where the status indicator indicates one of the authorized occupancy of the parking space and the unauthorized occupancy of the parking space.

In another implementation, a parking management system for monitoring a parking space is described. In an example, the parking management system includes a processor and a detection system coupled to the processor to ascertain presence of a vehicle in the parking space. Further a session establishment unit is coupled to the processor. The session establishment unit establishes a session with a user device of a user of a vehicle based on a session establishment request received from the user device. The vehicle is parked in the parking space. The session establishment unit further receives a parking validation message from the user device, where the parking validation message indicates a confirmation of occupancy of the parking space for parking by the vehicle. The session establishment unit further transmits a payment request message comprising an identity (ID) corresponding to the location of the parking space to the user device. The payment request message indicates a request for payment of parking charges corresponding to the parking space by the user. Further, the parking charges are based on a predefined charging policy. The parking management system further includes a communication unit coupled to the processor to communicate the presence of the vehicle in the parking space to a central server. The central server is communicatively coupled to the parking meter. The communication unit further receives an authorization status from the central server, where the authorization status indicates one of an authorized occupancy of the parking space and an unauthorized occupancy of the parking space based on the presence of the vehicle as detected and one of compliance and non-compliance to the predefined charging policy by the user. The parking management system further includes a display unit coupled to the processor to display a status indicator based on the authorization status, where the status indicator indicates one of the authorized occupancy of the parking space and the unauthorized occupancy of the parking space.

BRIEF DESCRIPTION OF THE DRAWINGS

The detailed description is described with reference to the accompanying figures. In the figures, the left-most digit of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 5($a$) illustrates top view of an exemplary parking meter, in accordance with the present subject matter;

FIG. 5($b$) illustrates a side view of the exemplary parking meter, in accordance with the present subject matter.

DETAILED DESCRIPTION

With the advancement in technology, parking management systems are nowadays deployed for managing parking spaces. Typically, in such parking management systems, a plurality of parking meters are deployed with an associated parking space. The parking meter may facilitate in ascertaining whether occupancy of a parking space is authorized or unauthorized. As may be understood, the authorization of the occupancy of the parking space may be ascertained based on one or more factors. For instance, the authorization may be ascertained based on payment of parking charges corresponding to the parking space. In another example, the authorization may also be based on parking of a vehicle within a stipulated area pertaining to the parking space. Failure of adherence to the aforementioned factors may result in unauthorized occupancy of the parking space and may result in invoking a fine on a user of the vehicle.

Typically, the user has to manually obtain a parking ticket corresponding to the parking space from a parking meter associated with parking space. For example, the user may obtain the parking ticket by pressing an interface of the parking meter. In a case where the parking meter is located remote from the location of the parking space, the user may face difficulty in locating the parking meter. Further, the user may have to be cautious as to not to lose the parking ticket as it may lead to imposition of a fine for loss of the parking ticket on the user.

In an approach of monitoring parking spaces in a parking facility, the parking meters or the parking spaces have an identification number associated with them. In said approach, a user who has parked his vehicle in a parking space is required to call a parking service provider to intimate occupancy of the parking space and initiate payment of corresponding parking charges within a stipulated time window. As may be gathered, the establishment of the call and the process of intimating the service provider may prove to be a cumbersome task. In certain cases, the user may not be able to establish the call with the service provider. For example, in case of network congestion, the call may not be established. As a result, the user may not be able to intimate the occupancy and initiate the payment within the stipulated time window. As a result, the occupancy of the parking space may be deemed as unauthorized and the user may be penalized with a monetary fine, or may be required to initiate the process yet again.

Conventional mechanisms also do not provide any way for determining or monitoring unauthorized occupancy of a parking space. An unauthorized occupancy may occur when the vehicle has been parked in the parking space for a time period greater than a permitted time. In the absence of any mechanisms, such monitoring may be delegated to parking attendants who may have to physically inspect all parking meters to determine whether the vehicle has over-extended the permitted parking time. Due to the extent of physical action required, the parking attendant in charge of the parking facility may fail to notice the unauthorized parking due to absence of any communication of unauthorized parking.

The present subject matter describes systems and methods for monitoring parking spaces. According to an implementation of the present subject matter, a parking meter, upon detecting presence of a vehicle in an associated parking space, may establish a session with a user device of a user of the vehicle. Upon establishment of the session, the parking meter may receive a parking validation message from the user device. The parking validation message indicates a confirmation, by the user, of the occupancy of the parking space. Thus, the use of parking tickets for indicating occupancy of the parking spaces is averted.

In an implementation, upon receiving the parking validation message, the parking meter may transmit a payment request message comprising an identity (ID) corresponding to the location of the parking space to the user device. The payment request message may indicate a request for payment of parking charges corresponding to the parking space based on a predefined charging policy.

In an embodiment, upon receiving the payment request message from the parking meter, the user device may transmit the payment request message to a central server over a parking payment session for facilitating payment of the parking charges corresponding to the parking space. The central server may be understood as a server deployed for management of the parking meters. Further, the central server may include a database of user accounts of all users registered with the central server.

In another embodiment, the user device may return the payment request message from to the parking meter. In said embodiment, the parking meter may establish the parking payment session for facilitating the payment of the parking charges.

Upon receiving the payment request message, the central server may transmit a parking time period request to the user device. The parking time period request may be understood as a request for receiving a user preference of time period for which the user may seek to park the vehicle. In an example, the parking time period request may include a fixed time period option and a dynamic time period option. The fixed time period option may be understood as an indication that the vehicle is to be parked for a predetermined time period. The dynamic time period option may be understood as an indication that the vehicle is to be parked for a variable time period. In response to the parking time period request, the central server may receive a user selection from the user device.

Based on the user selection and the predefined charging policy, the central server may ascertain whether the occupancy of the parking space is authorized or unauthorized. Thereafter, the central server may subsequently transmit an authorization status and the user selection to the parking meter. In said example, the authorization status may indicate an outcome of the authorization. Based on the authorization status, the parking meter may then display a status indicator for indicating authorized or unauthorized occupancy of the parking space. For example, in a case where the authorization status indicates authorized occupancy of the parking space, the parking meter may display a green light. In another case where the authorization status indicates unauthorized occupancy of the parking space, the parking meter may display a red light. Further, in an example, the parking meter may display one of the predetermined time period or a session activated message based on the user selection.

Thus, in accordance with the present subject matter, the confirmation of the occupancy of the parking space is done over the session established between the parking meter and the user device. Thus, the need for implementing parking tickets for confirming occupancy of the parking space is averted. Further, as may be understood from the foregoing description, the present subject matter facilitates in notifying an occurrence of unauthorized parking by displaying a corresponding indicator. As the need for intimating the service provider over a call is averted, the parking meter facilitates in providing a less complex system of managing the parking spaces. Thus, the complexity and the time associated with management of the parking spaces are reduced.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Further, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The manner in which the systems and the methods for parking management system shall be implemented has been explained in details with respect to the FIGS. 1, 2, 3, 4, 5(a), 5(b), and 6. While aspects of described systems and methods for multimedia content filtering can be implemented in any number of different computing systems, transmission environments, and/or configurations, the embodiments are described in the context of the following exemplary system(s).

Figure 1:
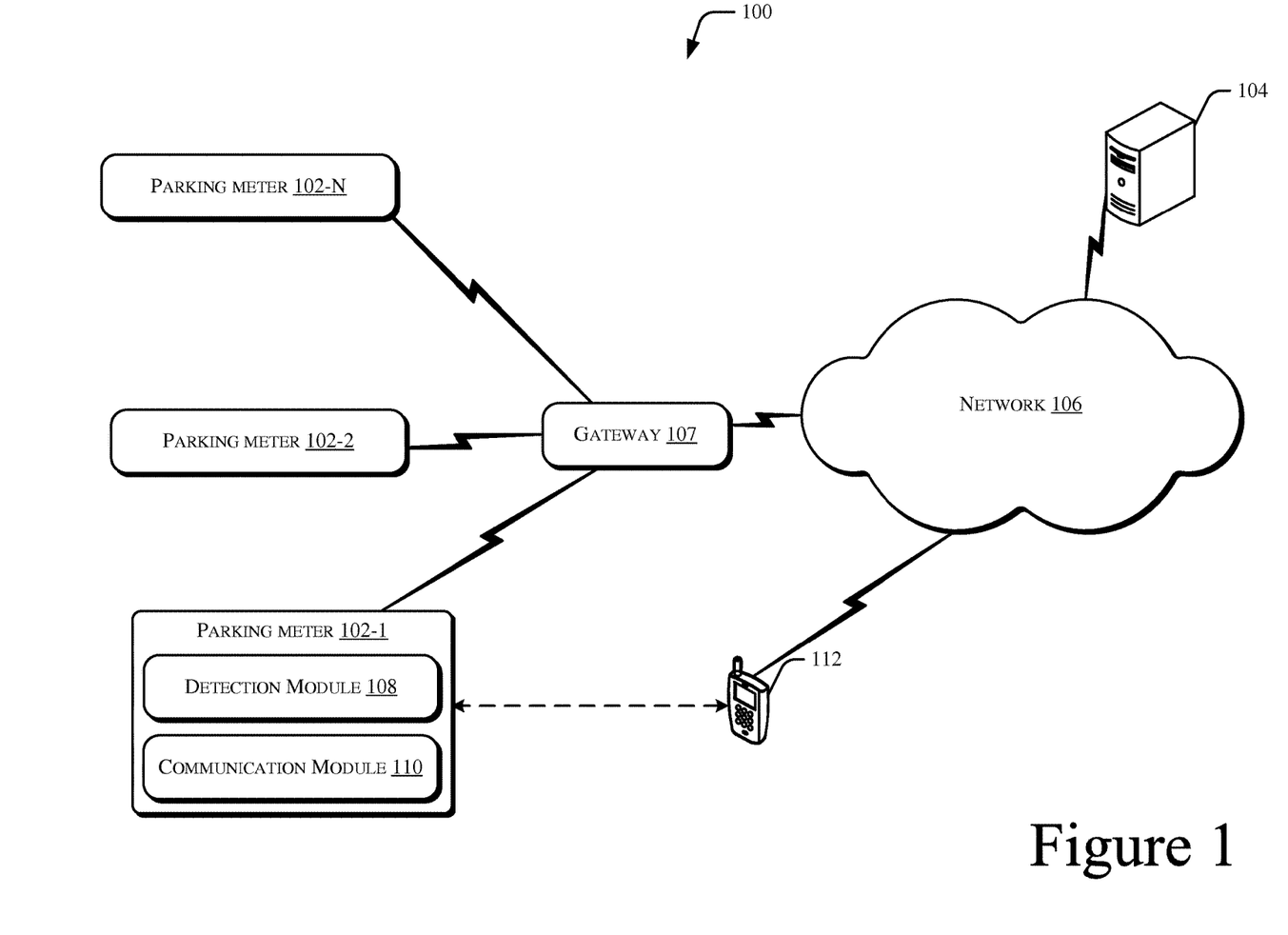
FIG. 1 illustrates a parking management system, according to an embodiment of the present subject matter.

FIG. 1 illustrates a parking management system 100. The parking management system 100 includes one or more parking meters 102-1, 102-2, . . . , and 102-N, hereinafter collectively referred to as the parking meters 102 and individually referred to as the parking meter 102, in communication with a central server 104, through a network 106, according to an embodiment of the present subject matter. In an example, the parking meters 102 may be deployed for monitoring a plurality of parking spaces (not shown in the figure). In said example, each of the parking meters 102 may be deployed in a vicinity of a corresponding parking space. For example, the parking meter 102 may be installed in ground adjacent to the parking space. The parking meter 102 facilitates in ascertaining whether occupancy of the corresponding parking space is authorized or not.

In an example, the network 106 may be a wireless network, a wired network, or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

In an example, the network 106 may include various network entities, such as a gateway 107. In said example, the parking meters 102 are able to connect to the network 106 through the gateway 107. In an example, data transmitted between the gateway 107 and the central server 104 are encrypted according to a secured protocol, say HTTPS Java Script Object Notation (JSON). Further, the data transmitted by the parking meter 102 and the gateway 107 is of the wireless type, say at the format DASH7 encrypted according to Advanced Encryption Standard (AES) 128 bits. As a result, the exchange of data between the parking meter 102 and the central server 104 is robust and is able to go through a building in a long distance and occupies a low bandwidth. The exchange of data is also secure in order to permit the establishment of a secure billing system. In an example, a Virtual Private Network (VPN) server (not shown) is used for descending data from the central server 104 to the parking meter 102 via the network 106 and the gateway 107.

Further, in an example, the central server 104 may be a space server, a parking server, data server, database, or file. In the said example, the central server 104 may receive occupancy status data from the parking meters 102. The occupancy status data may indicate whether associated parking space is occupied or vacant. Based on the occupancy status data, the central server 104 may generate parking data of available 'empty' parking spaces in the parking lot and transmits the same to a display panel, provided at an entrance of the parking lot, for being displayed. In an example, when a object, say, vehicle, stops at the entrance, the central server 104 may also display a map of the parking lot with an indication of each of the 'empty' parking spaces and a route from the entrance to the 'empty' parking spaces.

The parking meter 102 further includes a detection module 108 and a communication module 110. In an implementation, the detection module 108 may ascertain presence of a vehicle (not shown in this figure) in the parking space. For example, the detection module 108 may ascertain the presence of the vehicle by using a magnetic field (not shown in this figure) sensor and a radar sensor (not shown in this figure) of the parking meter 102. Upon ascertaining the presence of the vehicle, the communication module 110 may activate a session establishment unit of the parking meter 102 for establishing a session with a user device 112, for example, a mobile phone, a smart phone, and a tablet, of a user of the vehicle. Example of the session establishment unit may include, but are not limited to, a low-power Bluetooth device, a Wi-Fi device, and a near field communication (NFC) device. In an example, the session establishment unit may be activated for a fixed time. In said example, the fixed time may be of a small duration. Further, in said example, a power of the session establishment unit may be optimized to operate using low power radio waves. As a result of keeping a small time duration and low power of the session establishment unit, a number of session establishment units discovered by the user device may decrease, thereby reducing ambiguity associated with discovery of the session establishment unit. For instance, owing to the low power and the small time duration of activation, the session establishment units of the neighboring parking spaces may not show up in the initial scan of the user device for locating the session establishment unit of the parking meter where the user has parked the vehicle. Thereafter, the communication module 110 may establish a session with the user device 112 based on a session establishment request received from the user device 112. Upon establishment of the session, the communication module 110 may provide an indicator to the user for indicating a successful establishment of the session. For example, the communication module 110 may trigger a Light Emitting Diode (LED) of the parking meter 102 to glow, thereby indicating the successful establishment of the session.

In an implementation, upon successful establishment of the session, the communication module 110 may receive a parking validation message from the user device 112. The parking validation message indicates a confirmation of occupancy of the parking space for parking the vehicle from the user. Thereafter, the communication module 110 may transmit a payment request message to the user device 112. The payment request message includes an ID corresponding to the location of the parking space. Further, the payment request message indicates a request for payment of parking charges corresponding to the parking space by the user. In an example, the parking charges may be based on a predefined charging policy. As may be understood, the user may already agree to the predefined charging policy, for instance, during initial registration with a service provider providing the parking facility. In another example, the user may dynamically agree to the predefined charging policy.

Upon receiving the payment request message, the user device 112 may establish a parking payment session with the central server 104 for facilitating payment of the parking charges based on the predefined charging policy. The user device may then transmit the payment request message to the central server 104.

In another implementation, the user device 112 may transmit the payment request message back to the parking meter 102. In said implementation, the communication module 110 may establish the parking payment session with the central server 104 and may subsequently transmit the payment request message to the central server 104.

Upon receiving the payment request message, the central server 104 may transmit a parking time period request to the user device 112 for ascertaining the authorization of the occupancy of the parking space. In an example, the parking time period request may include a fixed time period option and a dynamic time period option. Thereafter, in response to the parking time period request, the central server 104 may receive a user selection indicative of a selection of one of the fixed time period option and the dynamic period option from the user device 112. Based on the user selection, the central server 104 may levy the parking charges on the user. For example, in a case where the user selects the fixed time period option, the central server 104 may levy the parking charges on the user based on the predefined charging policy. In said example, upon receiving the parking charges from the user device 112, the central server 104 may ascertain the occupancy of the parking space to be as authorized.

In another example, where the user may select the dynamic time period option, the central serer 104 may start a session and may intimate the same to the user based on the predefined charging policy. The session may be understood a time period of variable length indicating a total time period for which the vehicle was parked in the parking space. In said example, the central server 104 may ascertain the occupancy of the parking space to be authorized. The above mentioned selection of one of the fixed time period option and the dynamic time period option, and corresponding method of paying the parking charges based on the predefined charging policy may be understood as a compliance to the predefined charging policy. In another example, where the user fails to comply with the predefined charging policy, the central server 104 may ascertain the occupancy of the parking space to be unauthorized. The central server 104 may then transmit an authorization status indicative whether the occupancy of the parking space is authorized or not to the communication module 110.

In an example, the communication module 110 may receive the authorization status from the central server 104. Based on the authorization status, the communication module 110 may display, through a display unit (not shown in this figure) of the parking meter 102, a status indicator for indicating whether the occupancy of the parking space is authorized or not.

In an implementation, in addition to the authorization status, the communication module 110 may receive the user selection from the central server 104. Based on the user selection, the communication module 110 may further display one of a predetermined time period and a session activated message. For instance, in a case where the user selection is the fixed time period option, the display unit may display the predetermined time period selected by the user. In another case where the user selection is the dynamic time period option, the display unit may display a session activated message. In said case, the detection module 108 may further detect a departure of the vehicle using the magnetic field sensor and the radar sensor of the parking meter 102. Based on the detection of departure, the communication module 110 may display a session deactivated message through the display unit. Thereafter, the communication module 110 may transmit a time period for which the vehicle occupied the parking space to the central server 104 for facilitating payment of the parking charges corresponding to the time period.

Figure 2:
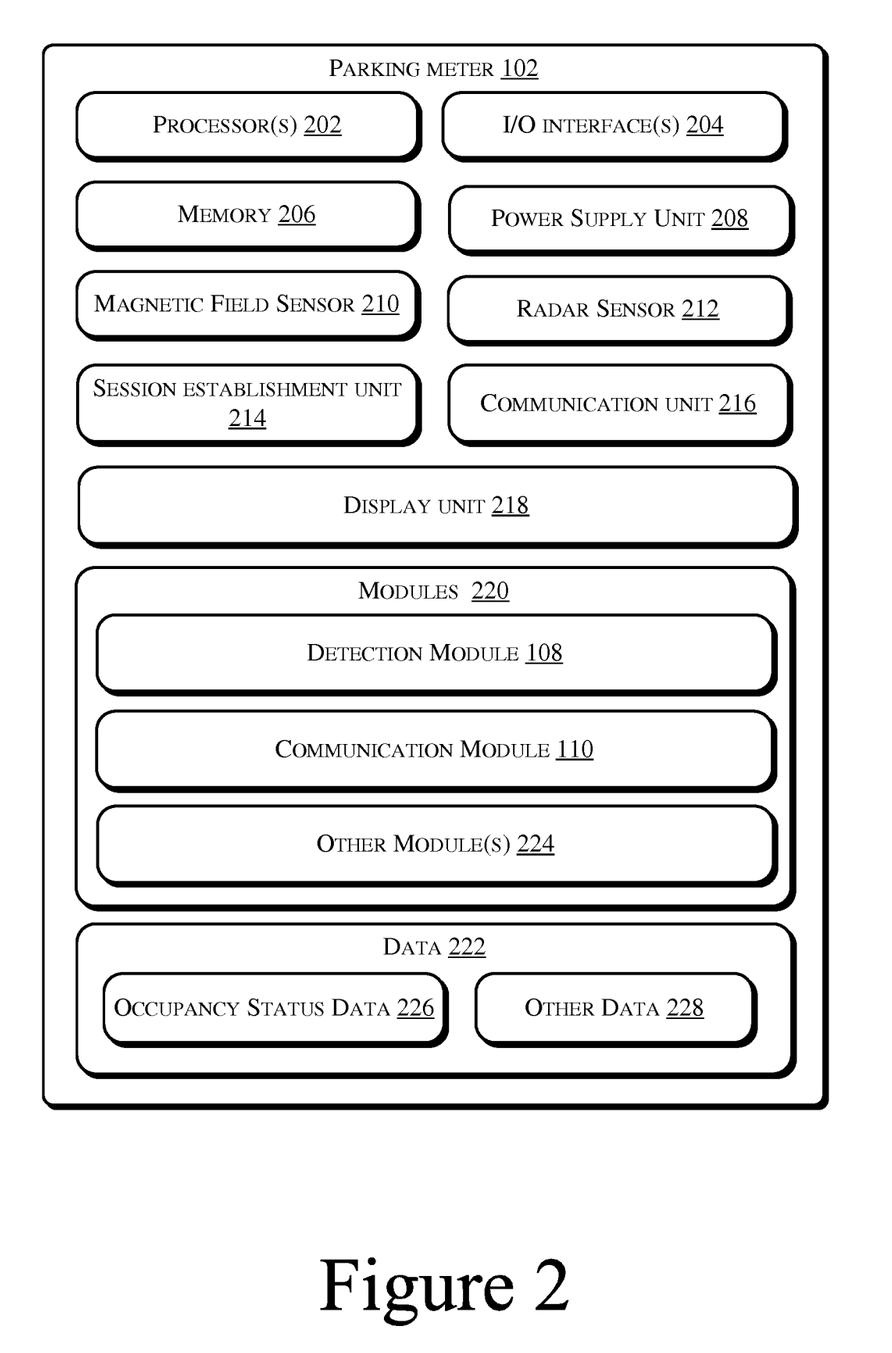
FIG. 2 illustrates components of a parking meter for monitoring a parking space, according to an embodiment of the present subject matter.

FIG. 2 illustrates components of the parking meter 102, in accordance with an embodiment of the present subject matter. In one implementation, the parking meter 102 includes one or more processor(s) 202, I/O interface(s) 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory 206.

The I/O interface(s) 204 may include a variety of software and hardware interfaces, for example, interfaces for peripheral device(s), such as a keyboard, a mouse, and an external memory. Further, the I/O interfaces 204 may facilitate multiple communications within a wide variety of protocol types including, operating system to application communication, inter process communication, etc.

The memory 206 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the parking meter 102 may include a power supply 208. In said implementation, the power supply 208 may include a battery and a power supply circuit (not shown in this figure). In an example, the battery has a capacity ranging from about 5000/10000 mAh to 3.6 V. Such capacity allows the parking meter 102 to be functional for a period of about 5 years. In an example, the power supply circuit includes a DC-DC voltage converter in order to lower the voltage supplied to some parts of the power supply circuit while reducing the power consumption. Further, in an example, the power supply circuit may include capacitances between the battery and active elements of the power supply circuit to reduce the instantaneous maximum load of the battery.

In an implementation, the parking meter 102 may include a magnetic field sensor 210 for determining presence or absence of a vehicle in a parking space associated with the parking meter 102. In an example, the magnetic field sensor 210 may be a Micro-Electro Mechanical System (MEMS) sensor. In another example, the magnetic field sensor 210 may be a one-dimensional or three-dimensional magnetic field sensor. The magnetic field sensor 210 is preferred over the other sensors because it is less sensitive to most kinds of fouling and consumes less energy as compared to the other kind of sensors. Further, the magnetic field sensor 210 is set into periodic operation by the processor 202. The magnetic field sensor 210, in operation, provides measuring values to the central server 102, where the measuring values are representative of the presence or absence of the vehicle in the parking space. Further, the parking meter 102 may include a radar sensor 212 for validating the presence or absence of the vehicle as detected by the magnetic field sensor 210. The magnetic field sensor 210 and the radar sensor 212 may, hereinafter, interchangeably be referred to as a detection system (210, 212).

The parking meter 102 further includes a session establishment unit 214 for establishing a session with a user device, such as the user device 112 of a user of the vehicle. Further, the parking meter 102 includes a communication unit 216 for communicating with the central server 104. Further, the parking meter 102 includes a display unit 218 for indicating authorized/unauthorized occupancy of the parking space.

In one implementation, the parking meter 102 may further include module(s) 220 and data 220. The modules 220 and the data 222 may be coupled to the processor(s) 202. The modules 220, amongst other things, include routines, programs, objects, components, data structures, etc., which perform particular tasks or implement particular abstract data types. The modules 220 may also be implemented as, signal processor(s), state machine(s), logic circuitries, and/or any other device or component that manipulate signals based on operational instructions. In another aspect of the present subject matter, the modules 220 may be computer-readable instructions which, when executed by a processor/processing unit, perform any of the described functionalities. The machine-readable instructions may be stored on an electronic memory device, hard disk, optical disk, or other machine-readable storage medium or non-transitory medium. In one implementation, the computer-readable instructions can be also be downloaded to a storage medium via a network connection.

In one implementation, the module(s) 220 includes the detection module 108, the communication module 110, and the other module(s) 224. Further, the other module(s) 224 may include programs or coded instructions that supplement applications or functions performed by the parking meter 102. The data 222 serves, amongst other things, as a repository for storing data processed, received and generated by one or more of the components of the modules 220. The data 222 includes, for example, occupancy status data 226 and other data 228. The other data 228 comprise data corresponding to one or more other module(s) 224.

In an implementation, the parking meter 102 may be deployed in the vicinity of the parking space for monitoring the parking space. In said implementation, the detection module 108 may monitor the occupancy of the parking space by using the magnetic field sensor 210 and the radar sensor 212. As may be understood, the detection module 108 may begin monitoring the occupancy when the parking space is vacant. For instance, the detection module 108 may trigger the magnetic field sensor 210 to compute a value of the magnetic field over the parking space. In an example, the magnetic field sensor 210 may compute the value using known conventional techniques. Further, the value of the magnetic field when the parking space is vacant may be ascertained as a default value of the magnetic field with respect to the parking space. In an example the detection module 108 may periodically or constantly monitor value of the magnetic field over the parking space using the magnetic field sensor 210. In a case where a value of the magnetic field is different from the default value, the detection module 108 may ascertain that a variation in the value of the magnetic field has occurred. The variation may be understood as an indication of the presence of the vehicle. In said case, the detection module 108 may then ascertain the presence of the vehicle in the parking space by using the radar sensor 212. For instance, the detection module 108 may trigger the radar sensor 212 for ascertaining the presence of the vehicle. In an example, the radar sensor 212 may use known techniques of detecting objects for ascertaining the presence of the vehicle in the parking space.

Upon ascertaining the presence of the vehicle in the parking space, the communication module 110 may activate the communication unit 216 to communicate the presence of the vehicle to the central server 104. Examples of the communication unit 216 include, but are not limited to, a radiofrequency device operating about 868 MHz.

In parallel, upon ascertaining the presence of the vehicle in the parking space, the communication module 110 may activate the session establishment unit 214 of the parking meter 102. Examples of the session establishment unit 214 include, but are not limited to, a Bluetooth device, a Wi-Fi device, and a near field communication (NFC) device. As mentioned previously, the session establishment unit 214 may be activated for a fixed time period. In an example, the session establishment unit 214 may receive a session establishment request from the user device for establishing a session with the user device of the user. In a case where the session with the user device is successfully established, the communication module 110 may provide an indicator to the user through the display unit 218. For example, the communication module 110 may provide instructions to light an LED of the display unit 218 to indicate successful establishment of the session. Upon successful establishment of the session, the communication module 110 may receive the parking validation message from the user device through the session establishment unit 214. Thereafter, the communication module 110 may transmit a payment request message comprising an ID corresponding to the location of the parking space to the user device 112 through the session establishment unit 214. The payment request message indicates a request for payment of parking charges corresponding to the parking space by the user. The user device 112 may then transmit the payment request message to the central server over a parking payment session established with the central server 104 for facilitating payment of the parking charges.

In another implementation, the user device 112 may transmit the payment request message back to the session establishment unit 214. In said implementation, the communication module 110 may establish the parking payment session with the central server 104 through the communication unit 216. The communication module 110 may then transmit the payment request message to the central server 104 for facilitating the payment of the parking charges.

Upon receiving the payment request message, the central server 102 may validate the occupancy of the parking space based on the predefined charging policy in a manner as described in FIG. 1 and may subsequently transmit an authorization status to the parking meter 102. As mentioned previously, the occupancy status indicates whether the occupancy of the parking space is authorized or unauthorized.

In an example, the communication unit 216 may receive the authorization status from the central server 104. The authorization status may be stored in the occupancy status data 226. Based on the authorization status, a status indicator may be displayed by the communication module 110. For example, in a case where the authorization status indicates authorized occupancy of the parking space, the communication module 110 may display may display a green color through the display unit 218. In another case, where the authorization status indicates unauthorized occupancy of the parking space, the communication module 110 may display a red color through the display unit 218.

In one implementation, the communication unit 216 may also receive the user selection from the central server 104. As mentioned previously, the user selection may be one of the fixed time period option and the dynamic time period option. The fixed time period option may indicate that the vehicle is to be parked for a predetermined time period. The dynamic time period option may indicate that the vehicle is to be parked for a variable time period. In a case where the user selection is the fixed time period option, the communication module 110 may display the predetermined time period selected by the user through the display unit 218. Further, upon completion of a predetermined time interval, the communication module 110 may decrease the predetermined time period to obtain a remaining time period. The communication module 110 may then display the remaining time period through the display unit 218. In another case where the user selection is the dynamic time period option, the communication module 110 may display a 'session activated message', through the display unit 218. In said case, the detection module 108 may detect a departure of the vehicle using the magnetic field sensor 210. Upon detection of the departure, the communication module 110 may display a 'session deactivated message' through the display unit 218. Further, the communication module 110 may transmit a time period for which the parking space was occupied by the vehicle to the central server 104. The central server 104 may then levy the parking charges corresponding to the time period on the user.

Figure 3:
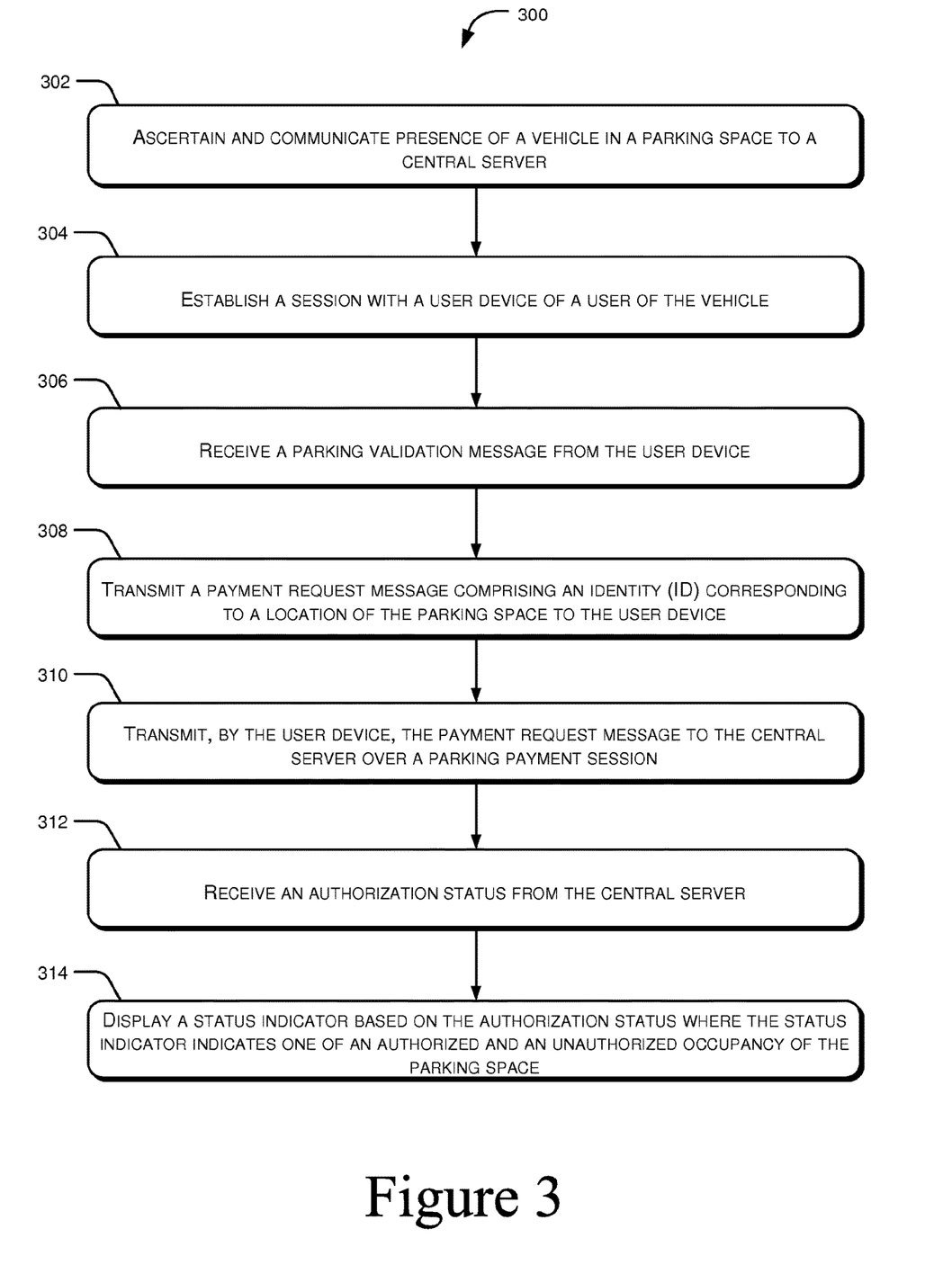
FIG. 3 illustrates a method for monitoring a parking space, in accordance with the present subject matter.
Figure 4:
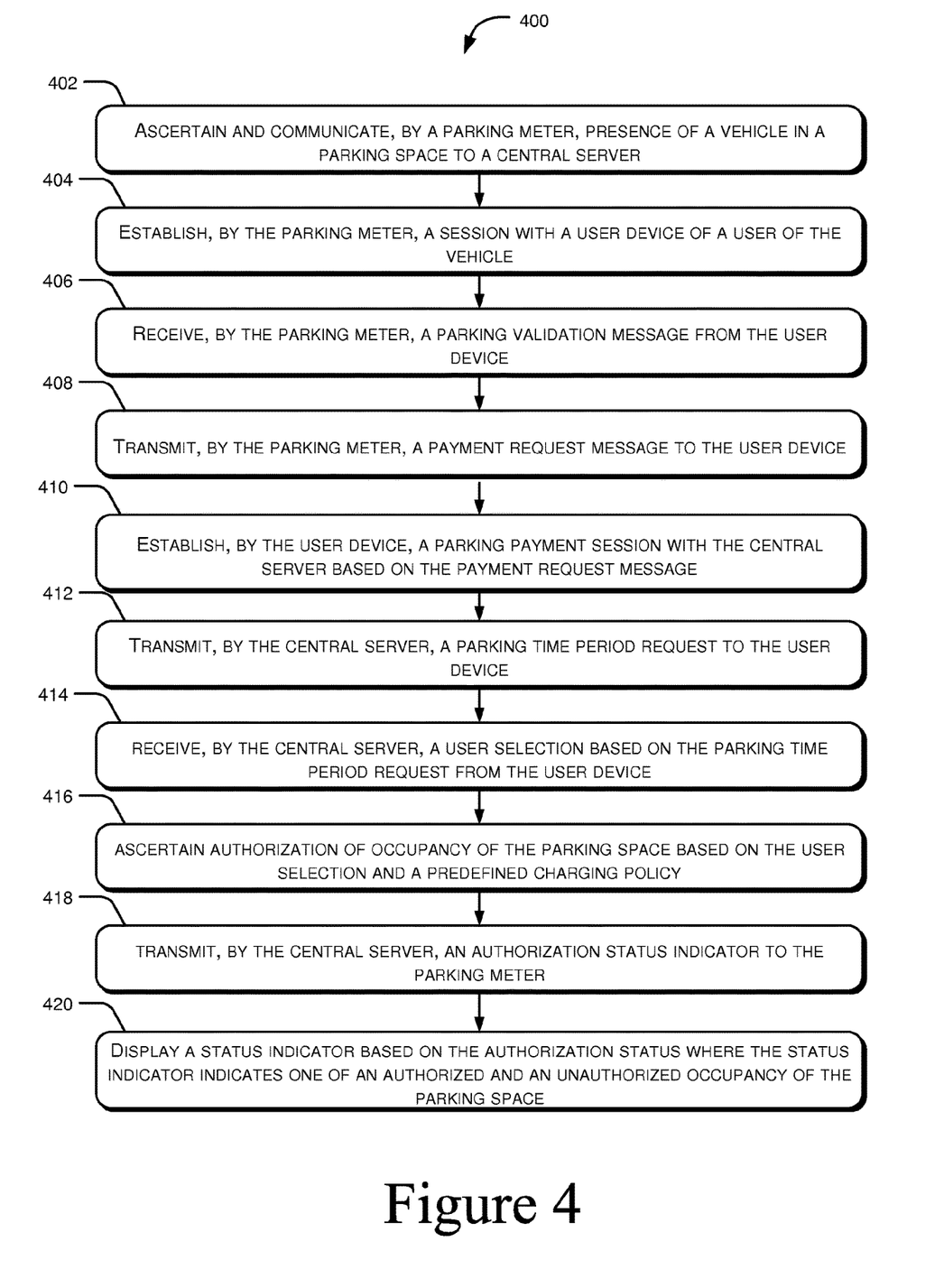
FIG. 4 illustrates a method for monitoring a parking space, in accordance with the present subject matter.

FIGS. 3 and 4 illustrate a method 300 and 400, respectively, for monitoring a parking space, in accordance with an embodiment of the present subject matter.

The order in which the methods 300 and 400 are described is not intended to be construed as a limitation, and any number of the described method blocks can be combined in any order to implement methods 300 and 400, or an alternative method. Additionally, individual blocks may be deleted from the methods 300 and 400 without departing from the spirit and scope of the subject matter described herein. Furthermore, the methods 300 and 400 may be implemented in any suitable hardware, machine readable instructions, firmware, or combination thereof.

A person skilled in the art will readily recognize that steps of the methods 300 and 400 can be performed by programmed computers. Herein, some examples are also intended to cover program storage devices and non-transitory computer readable medium, for example, digital data storage media, which are machine or computer readable and encode machine-executable or computer-executable instructions, where said instructions perform some or all of the steps of the described methods 300 and 400. The program storage devices may be, for example, digital memories, magnetic storage media, such as magnetic disks and magnetic tapes, hard drives, or optically readable digital data storage media.

With reference to FIG. 3, at block 302, presence of a vehicle in a parking space is ascertained and communicated to a central server. In an example, the presence of the vehicle may be ascertained using a magnetic field sensor and a radar sensor of a parking meter. For example, the magnetic field sensor may detect a variation in a value of magnetic field over the parking space. Based on the detection of the variation, the radar sensor may be triggered to ascertain the presence of the vehicle in the parking space. The presence of the vehicle may then be communicated to the central server.

The central server may be communicatively coupled to the parking meter. In an implementation, the detection module 108 may ascertain the presence of the vehicle in the parking space. Upon ascertaining the presence of the vehicle in the parking space, the communication module 110 activates the communication unit 216 to communicate the presence of the vehicle to the central server 104.

At block 304, a session with a user device of a user of the vehicle is established. Upon ascertaining the presence of the vehicle, a session establishment unit of the parking meter is activated. The session establishment unit may then receive a session establishment request from the user device for establishing the session. In an example, the session establishment unit 214 may receive the session establishment request from the user device for establishing the session.

At block 306, a parking validation message is received from the user device. The parking validation message indicates a confirmation of occupancy of the parking space for parking by the vehicle. In an example, the session establishment unit 214 may receive the parking validation message from the user device 112.

At block 308, a payment request message comprising an identity (ID) corresponding to the parking space is transmitted to the user device. The payment request message indicates a request for payment of parking charges corresponding to the parking space by the user. Further, the parking charges are based on a predefined charging policy. In an implementation, the parking meter may transmit the payment request message to the user device 112.

At block 310, the payment request message is transmitted by the user device to the central server over a parking payment session. The parking payment session may be established between the user device and the central server. Upon receiving the payment request message, the central server 104 may authenticate authorization of the parking space in a manner as described previously in FIG. 1. In an example, the user device 112 may establish the parking payment session with the central server 104.

At block 312, an authorization status is received from the central server. The authorization status indicates one of an authorized occupancy of the parking space and an unauthorized occupancy of the parking space. In an example, the authorization status may be based on one of compliance and non-compliance to the predefined charging policy by the user. For instance, in a case where the user complies with the predefined charging policy, the authorization status may indicate authorized occupancy of the parking space. In another case where the user does not comply with the predefined charging policy, the authorization status may indicate the unauthorized occupancy of the parking space. In an example, the communication unit 216 may receive the authorization status from the central server 104.

At block 314, a status indicator based on the authorization status is displayed, where the status indicator indicates one of an authorized and an unauthorized occupancy of the parking space. In an example, the display unit 218 may display the status indicator. In an example, where the authorization status indicates the authorized occupancy, the status indicator may be green in color. In an example, where the authorization status indicates the authorized occupancy, the status indicator may be of red color. In an example, the parking meter 102 may display the status indicator.

With respect to FIG. 4, at block 402, presence of a vehicle in a parking space is ascertained and communicated, by a parking meter, to a central server. In an example, the presence of the vehicle may be ascertained using a magnetic field sensor and a radar sensor of the parking meter. For example, the magnetic field sensor may detect a variation in a value of magnetic field over the parking space. Based on the detection of the variation, the radar sensor may be triggered to ascertain the presence of the vehicle in the parking space. The presence of the vehicle may then be communicated to the central server. The central server may be communicatively coupled to the parking meter. In an implementation, the detection module 108 may ascertain the presence of the vehicle in the parking space. Upon ascertaining the presence of the vehicle in the parking space, the communication module 110 may activate the communication unit 216 to communicate the presence of the vehicle to the central server 104

At block 404, a session with a user device of a user of the vehicle is established by the parking meter. Upon ascertaining the presence of the vehicle, a session establishment unit of the parking meter is activated. The session establishment unit may then receive a session establishment request from the user device for establishing the session. In an example, the session establishment unit 214 may receive the session establishment request from the user device 112 for establishing the session.

At block 406, a parking validation message is received from the user device by the parking meter. The parking validation message indicates a confirmation of occupancy of the parking space for parking by the vehicle. In an example, the parking meter 102 may receive the parking validation message from the user device 112.

At block 408, a payment request message is transmitted by the parking meter to the user device. The payment request message indicates a request for payment of parking charges corresponding to the parking space by the user based on a predefined charging policy. Further, the payment request message may include an identity (ID) corresponding to a location of the parking space. In an example, the session establishment unit 214 may transmit the payment request message to the user device.

At block 410, a parking payment session is established, by the user device, with the central server based on the payment request message. In an example, upon receiving the payment request message, the user device may establish the parking payment session for facilitating payment of the parking charges corresponding to the parking space. In said example, the user device may transmit the ID of the parking space for which the payment is to be initiated to the central server over the parking payment session.

At block 412, a parking time period request is transmitted to the user device by the central server. In an example, the parking time period request may include a fixed time period option and a dynamic time period option. The fixed time period option may be understood as an indication that the vehicle is to be parked for a predetermined time period. The dynamic time period option may be understood as an indication that the vehicle is to be parked for a variable time period. In an implementation, the central server 104 may transmit the parking time period request to the user device.

At block 414, a user selection based on the parking time period request is received from the user device. In an example, the central server 104 may receive the user selection from the user device. The user selection indicates a selection of one of the fixed time period option and the dynamic time period option by the user.

At block 416, authorization of occupancy of the parking space is ascertained based on the user selection and a predefined charging policy. In a case where the user selects the fixed time period option, the central server may levy the parking charges corresponding to the predetermined time period on the user. In case of a successful payment, the occupancy of the parking space may be deemed to be authorized. In another case where the user may select the dynamic time period option, the central server may start a session and may intimate the same to the user. In said case, the central server may ascertain the occupancy of the parking space to be authorized. In a case where the user does not pay the parking charges or does not agree to start the session, the occupancy of the parking space may be ascertained to be unauthorized.

At block 418, an authorization status indicator is transmitted to the parking meter by the central server. The authorization status indicates whether the occupancy of the parking space is authorized or unauthorized. In an example, the central server 104 may transmit the authorization status to the parking meter 102.

At block 420, a status indicator based on the authorization status is displayed by the parking meter, where the status indicator indicates one of an authorized and an unauthorized occupancy of the parking space. In an example, the display unit 218 may display the status indicator. In an example, where the authorization status indicates the authorized occupancy, the status indicator may be green in color. In an example, where the authorization status indicates the authorized occupancy, the status indicator may be of red color. In an example, the parking meter 102 may display the status indicator.

Figure 5A:
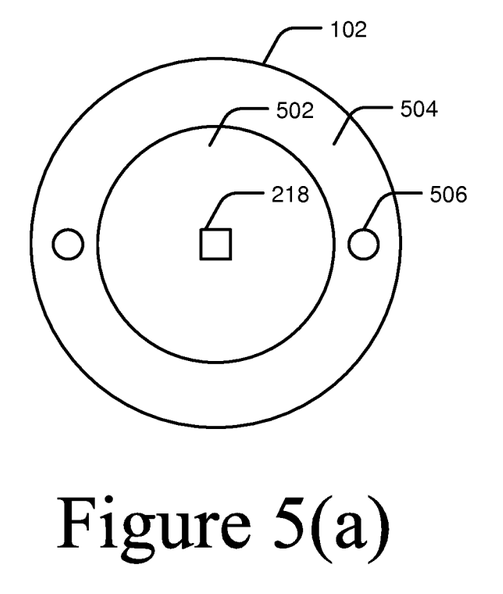
Figure 5B:
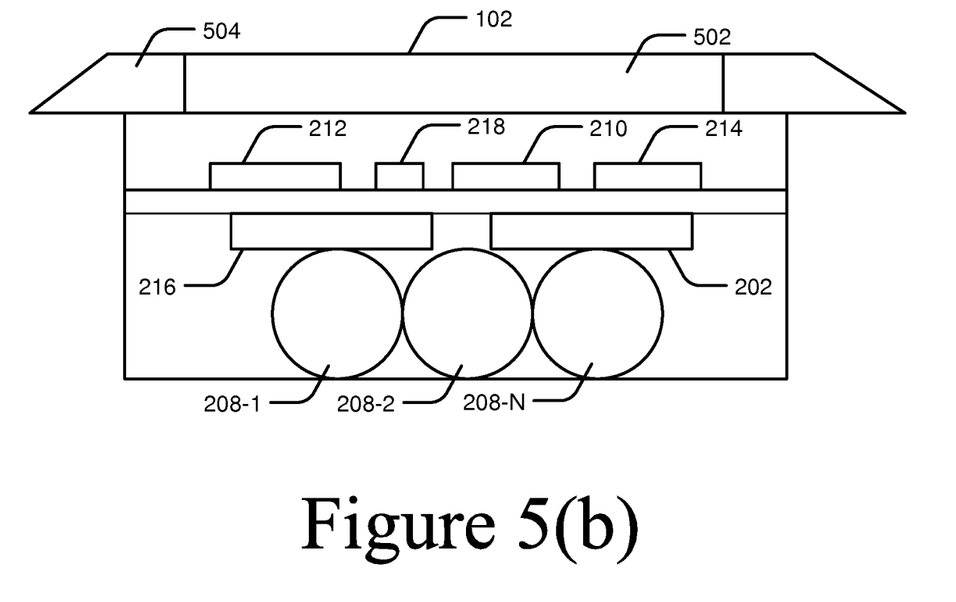

FIG. 5(*a*) illustrates a top view of an exemplary parking meter, in accordance with the present subject matter. FIG. 5(*b*) illustrates a side view of the exemplary parking meter, in accordance with the present subject matter.

In an example, the parking meter 102 includes the display unit 218 for indicating authorized/unauthorized occupancy of an associated parking space. The parking meter 102 further includes a frosted glass 502, for evenly distributing the light from the display unit 218 across a surface area of the frosted glass 502. The parking meter 102 further includes a clamping ring 504 for holding the frosted glass 502 and the display unit 218 in their respective positions. The parking meter 102 further includes a fastening unit 506, for example, a nut-bolt for fixing the parking meter 102 at a desired location. In said example, the parking meter 102 may be powered by one or more of power supply units 208-1, 208-2, . . . , and 208-N, hereinafter collectively referred to as the power supply units 208 and individually referred to as the power supply unit 208. Further, the parking meter 102 includes the processor 202, the session establishment unit 214, the communication unit 216, the magnetic field sensor 210, and the radar sensor 212. In an example, the session establishment unit 214 may be a low-power Bluetooth unit and may be activated only for a fixed time as described earlier. Further, the communication unit 216 may operate at a frequency of about 868 MHz and may communicate with the central server 104 through the gateway 107. In an example, data transmitted between the communication unit 216 and the gateway 107 is of the wireless type, say at the format DASH7 encrypted according to Advanced Encryption Standard (AES) 128 bits. As a result, the exchange of data between the communication unit 216 and the central server 104 is robust and is able to go through a building in a long distance and occupies a low bandwidth. The exchange of data is also secure in order to permit the establishment of a secure billing system. In an example, a Virtual Private Network (VPN) server (not shown) is used for descending data from the central server 104 to the communication unit 216 via the network 106 and the gateway 107.

In an example, the parking meter 102 may be provided in the vicinity of the parking space. In one implementation, the parking meter may be set up within a surface of the ground in the vicinity of the parking space. In another implementation, the parking meter may be set up within a surface of a wall or a pole in the vicinity of the parking space. Further, the parking meter may be fixed in the ground or on the wall using the fastening unit 506. In operation, the parking meter 102 may detect a presence of a vehicle in the parking space using the magnetic field sensor 210 and the radar field sensor 212. Upon detecting the presence of the vehicle, the processor 202 may activate the session establishment unit 214 for the fixed time period. Thereafter, the parking meter 102 may receive a parking validation message over a session established between a user device of a user of the vehicle and the session establishment unit 214. Thereafter, the parking meter 102 may transmit the payment request message comprising the ID of the parking meter 102 to the user device. The ID corresponds to a location of the parking meter. Based on the payment request message, the user device may establish a parking payment session with the central server 104 for payment of the parking charges corresponding to the parking space based on a predefined policy. In another implementation, upon receiving the payment request message back from the user device, the parking meter 102 may establish the parking payment session with the central server 104 through the communication unit 216. Thereafter, the communication unit 216 may receive an authorization status from the central server 104. In an example, the authorization status may indicate one of an authorized occupancy of the parking space and an unauthorized occupancy of the parking space based on one of compliance and non-compliance to the predefined charging policy by the user. Based on the authorization status, a status indicator indicating one of the authorized occupancy of the parking space and the unauthorized occupancy of the parking space may be displayed through the display unit 218. For example, in a case where the occupancy of the parking space is authorized, the green light may be displayed through the display unit 218. In another case where the occupancy of the parking space is unauthorized, the red light may be displayed through the display unit 218. Thus, the parking meter 102 facilitates in monitoring the parking space.

Figure 6:
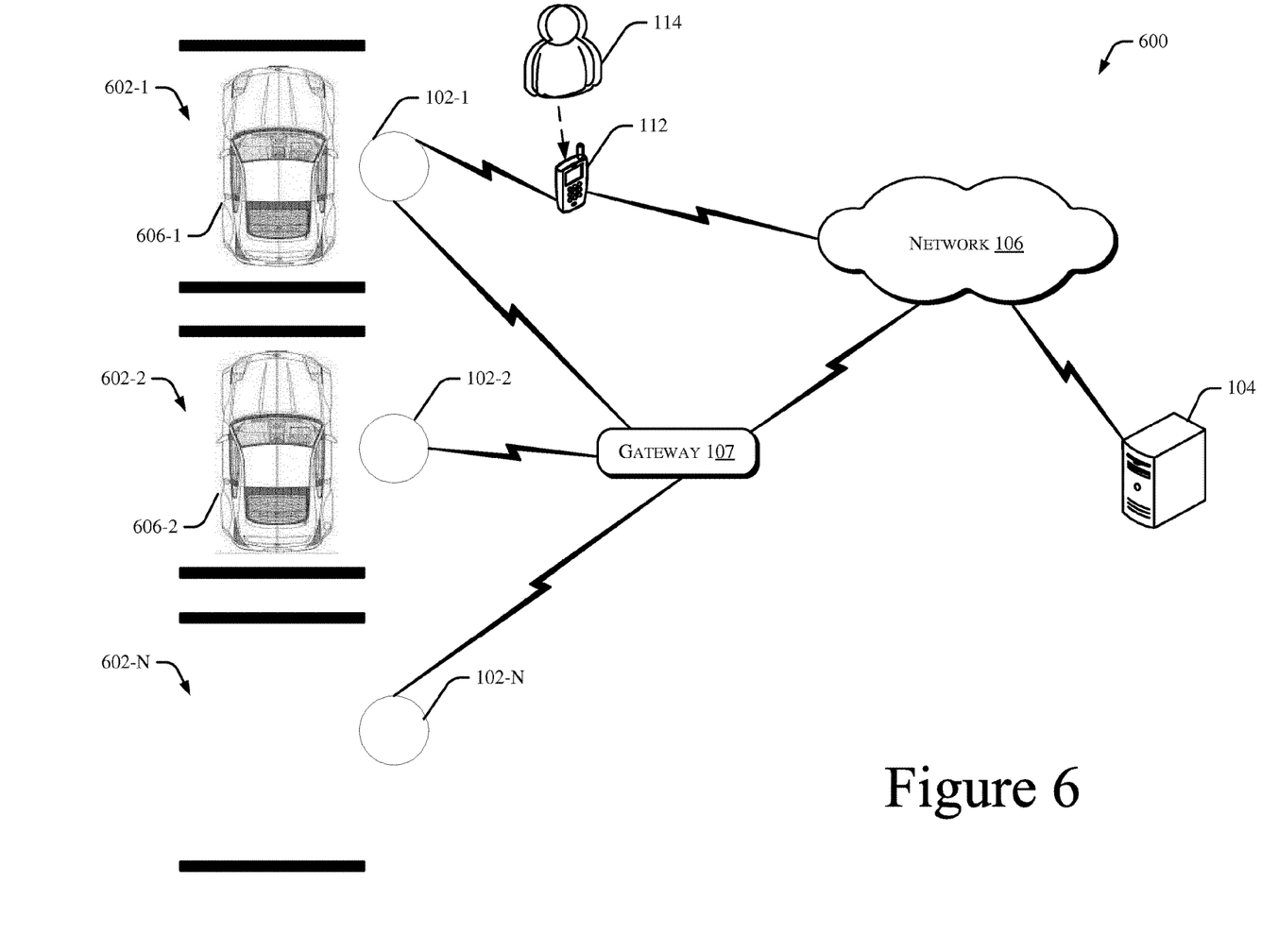
FIG. 6 illustrates a network environment implementing a parking management system, in accordance with the present subject matter.

FIG. 6 illustrates a network environment 600 implementing a parking management system. The network environment 600 includes a plurality of parking spaces 602-1, 602-2, . . . , 602-N, hereinafter collectively referred to as the parking spaces 602 and individually referred to as the parking space 602. As show in the Figure, each of the parking space 602 has a parking meter, such as the parking meter 102, associated with it. For example, the parking space 602-1 has a parking meter 102-1 associated with it, the parking space 602-2 has a parking meter 102-2 associated with it, and the parking space 602-N has a parking meter 102-N associated with it. The parking meter 102 may facilitate in indicating whether occupancy of the parking space 602 is authorized or not. The network environment 600 further includes the gateway 107. The gateway 107 facilitates the parking meters 102 to connect with the central server 104 over the network 106.

Further, as shown in the figure, the parking space 602-1 may be occupied by a vehicle 606-1 and the parking space 602-2 may be occupied by a vehicle 606-2. In an implementation, the parking meter 102-1 may ascertain the presence of the vehicle 606-1 in the parking space 602-1 by using a magnetic sensor and a radar sensor, such as the magnetic field sensor 210, and the radar sensor 212, respectively. Upon ascertaining the presence of the vehicle the parking meter 102-1 may establish a session with a user device, such as the user device 112, of a user 114 of the vehicle 602-1. For instance, the parking meter 102-1 may activate a session establishment unit, such as the session establishment unit 214 for the fixed time period. Thereafter, the parking meter 102-1 may receive a session establishment request from the user device 112 for establishing the session. In an example, the parking meter 102-1 may provide an indicator, for example, lighting an LED of the parking meter 102-1, for indicating successful establishment of the session.

In an implementation, upon establishment of the session, the parking meter 102-1 may receive a parking validation message from the user device 112. The parking validation message indicates a confirmation of occupancy of the parking space for parking the vehicle from the user. In said implementation, the parking meter 102 may then transmit the payment request message to the user device 112 for facilitating payment of parking charges corresponding to the parking space based on a predefined charging policy. Thereafter, the user device 112 may establish the parking payment session with the central server 104 for making the payment for occupancy of the parking space based on the predefined charging policy. In another implementation, the user device 112 may revert the payment request message to the parking meter 102. In said implementation, the parking meter 102 may establish the parking payment session with the central server 104 through the gateway 107.

The central server 104 may then ascertain authorization of the occupancy of the parking space in a manner as described in FIG. 1 and may subsequently provide an authorization status to the parking meter 102-1. Based on the authorization status, the parking meter 102-1 may display a status indicator indicating one of an authorized parking and an unauthorized parking of the parking space 602-1. For example, in a case where the occupancy of the parking space 602-1 is authorized, the parking meter 602-1 may display a green light through a display unit of the parking meter 102-1. In another case, where the occupancy of the parking space 602-1 is unauthorized, the parking meter 602-1 may display a red light through the display unit. For instance, in a case where the vehicle 606-2 is occupying the parking space 602-2 for a time period more than a permitted time for which payment charges were received by the central server 104, the parking meter 102-2 may display the red light indicating unauthorized occupancy.

Although implementations for parking management system are described, it is to be understood that the present subject matter is not necessarily limited to the specific features or methods described. Rather, the specific features and methods are disclosed as implementations for parking management system.

I claim:

1. A method for monitoring a parking space by a parking meter, the method comprising:
   determining, by the parking meter, presence of a vehicle in the parking space by measuring periodically magnetic field values and transmitting the measured values to a central server, where the measured values are representative of the presence or absence of the vehicle in the parking space;
   communicating, by the parking meter, presence of the vehicle in the parking space to the central server, wherein the central server is communicatively coupled to the parking meter;

validating the presence of the vehicle as detected in the parking space by measuring radar values, wherein the radar values indicate the presence of the vehicle in the parking space;

activating, for a pre-determined period of time, a session establishment unit of the parking meter;

establishing, by the parking meter, a session with a user device of a user of the vehicle based on a session establishment request received from the user device during the pre-determined period of time;

indicating, by the parking meter, that the session has been established with the user device by activating a light emitting diode (LED) of the parking meter;

receiving, by the parking meter, a parking validation message from the user device, wherein the parking validation message indicates a confirmation of occupancy of the parking space for parking by the vehicle;

transmitting, by the parking meter, a payment request message comprising an identity (ID) corresponding to a location of the parking space to the user device, and wherein the payment request message indicates a request for payment of parking charges corresponding to the parking space by the user, and wherein the parking charges are based on a predefined charging policy;

transmitting, by the user device, the payment request message to the central server over a parking payment session for facilitating payment of the parking charges corresponding to the parking space, and wherein the parking payment session is established between the user device and the central server;

transmitting, by the central server, a parking time period selection request to the user device for ascertaining authorization parameters of the occupancy of the parking space;

receiving, by the parking meter, an authorization status from the central server, wherein the authorization status indicates one of an authorized occupancy of the parking space and an unauthorized occupancy of the parking space based on the presence of the vehicle as ascertained and one of compliance and non-compliance to the predefined charging policy by the user;

displaying, by the parking meter, a status indicator based on the authorization status, wherein the status indicator indicates one of the authorized occupancy of the parking space and the unauthorized occupancy of the parking space;

detecting, by the parking meter, a departure of the vehicle from the parking space by periodically measuring magnetic field values and transmitting the measured magnetic field values to the central server, wherein the magnetic field values are representative of the absence of the vehicle in the parking space;

validating the absence of the vehicle as detected in the parking space by measuring radar values, wherein the radar values are representative of the absence of the vehicle in the parking space;

determining, based on detecting the departure, an amount of time that the vehicle occupied the parking space;

transmitting, by the parking meter and to the central server, an indication of the amount of time that the vehicle occupied the parking space; and determining, based on the amount of time that the vehicle occupied the parking space and the predefined charging policy, a parking charge corresponding to the vehicle.

2. The method as claimed in claim 1, wherein the determining the presence of the vehicle further comprises detecting, by a magnetic field sensor of the parking meter, a variation in a magnetic field arising due to presence of the vehicle in the parking space.

3. The method as claimed in claim 2, wherein the determining the presence of the vehicle further comprises, in response to detecting the variation in the magnetic field, triggering a radar sensor of the parking meter to confirm the presence of the vehicle in the parking space.

4. The method as claimed in claim 1, wherein the method further comprises receiving, by the parking meter, a user selection from the central server, wherein the user selection corresponds to a dynamic time period option, and wherein the dynamic time period option indicates that the vehicle is to be parked for a variable time period.

5. The method as claimed in claim 4, wherein the method further comprises displaying, by a display unit of the parking meter, a session activated message based on the user selection.

6. The method as claimed in claim 5, further comprising transmitting, by the central server, a confirmation request to the user device, wherein the confirmation request is a request to ascertain end of the occupancy of the parking space by the vehicle, and wherein the confirmation request further indicates the parking charge.

7. A parking management system for monitoring a parking space comprising:
a processor;
a detection system coupled to the processor, wherein the detection system is configured to:
determine presence of a vehicle in the parking space by measuring periodically magnetic field values and transmitting the measured values to a central server, where the measured values are representative of the presence or absence of the vehicle in the parking space;
validate the presence of the vehicle as detected in the parking space by measuring radar values, wherein the radar values indicate the presence of the vehicle in the parking space;
determine a start time at which a vehicle entered the parking space;
detect a departure of the vehicle from the parking space by periodically measuring magnetic field values and transmitting the measured magnetic field values to the central server, wherein the magnetic field values are representative of the absence of the vehicle in the parking space;
validate the absence of the vehicle as detected in the parking space by measuring radar values, wherein the radar values are representative of the absence of the vehicle in the parking space;
determine an end time at which the vehicle vacated the parking space;
determine, based on a difference between the start time and the end time, an amount of time during which the vehicle occupied the parking space; and
transmit, to the central server, the amount of time;
a session establishment unit coupled to the processor, wherein the session establishment unit is configured to activate for a pre-determined period of time after detecting the presence of the vehicle,
establish, during the pre-determined period of time, a session with a user device of a user of the vehicle based on a session establishment request received from the user device;

indicate that the session has been established with the user device by activating a light emitting diode (LED);

receive a parking validation message from the user device, wherein the parking validation message indicates a confirmation of occupancy of the parking space for parking by the vehicle; and transmit a payment request message comprising an identity (ID) corresponding to a location of the parking space to the user device, and wherein the payment request message indicates a request for payment of parking charges corresponding to the parking space by the user, and wherein the parking charges are based on a predefined charging policy;

a communication unit coupled to the processor, wherein the communication unit is configured to, communicate the presence of the vehicle in the parking space to the central server;

receive an authorization status from the central server, wherein the authorization status indicates one of an authorized occupancy of the parking space and an unauthorized occupancy of the parking space based on the presence of the vehicle as detected and one of compliance and non-compliance to the predefined charging policy by the user; and a display unit coupled to the processor, wherein the display unit is configured to display a status indicator based on the authorization status, wherein the status indicator indicates one of the authorized occupancy of the parking space and the unauthorized occupancy of the parking space.

8. The parking management system as claimed in claim 7, wherein the detection system further comprises, a magnetic field sensor coupled to the processor, the magnetic field sensor configured to detect a variation in a magnetic field arising due to presence of the vehicle in the parking space; and a radar sensor coupled to the processor, the radar sensor configured to ascertain presence of the vehicle in the parking space, wherein determining the start time comprises determining, based on the magnetic field sensor and the radar sensor, the start time, and wherein determining the end time comprises determining, based on the magnetic field sensor and the radar sensor, the end time.

9. The parking management system as claimed in claim 7, wherein the session establishment unit is further configured to provide an indicator to the user upon successful establishment of the session with the session establishment unit.

10. The parking management system as claimed in claim 7, wherein the communication unit is further configured to receive a user selection from the central server, wherein the user selection is at least one of a fixed time period option and a dynamic time period option, and wherein the fixed time period option indicates that the vehicle is to be parked for a predetermined time period, and wherein the dynamic time period option indicates that the vehicle is to be parked for a variable time period.

11. The parking management system as claimed in claim 10, wherein the display unit is further configured to display at least one of the predetermined time period and a session activated message based on the user selection.

12. The parking management system as claimed in claim 11, wherein the processor is configured to, compute a remaining time period by decrementing the predetermined time period by a predetermined time interval, wherein the predetermined time interval is computed from a time at which parking charges corresponding to the predetermined time period are received by the central server; and wherein the display unit is further configured to display the remaining time period.

13. The parking management system as claimed in claim 7, wherein the parking management system further comprises a parking meter, wherein the parking meter comprises the processor, the detection system, the session establishment unit, the communication unit and the display unit.

14. The parking management system as claimed in claim 7, wherein the parking management system comprises the central server, and wherein the central server is configured to cause display of a map of a parking lot comprising the parking space.

15. The parking management system as claimed in claim 14, wherein the central server is configured to cause display, on the map, of a route from an entrance of the parking lot to the parking space.

16. The parking management system as claimed in claim 15, wherein the central server is configured to cause display of the map on a display located at the entrance.

17. The method as claimed in claim 1, wherein the method further comprises causing display of a map of a parking lot comprising the parking space, wherein the map comprises a route beginning at an entrance of the parking lot and terminating at the parking space.

* * * * *